Patented Nov. 2, 1926.

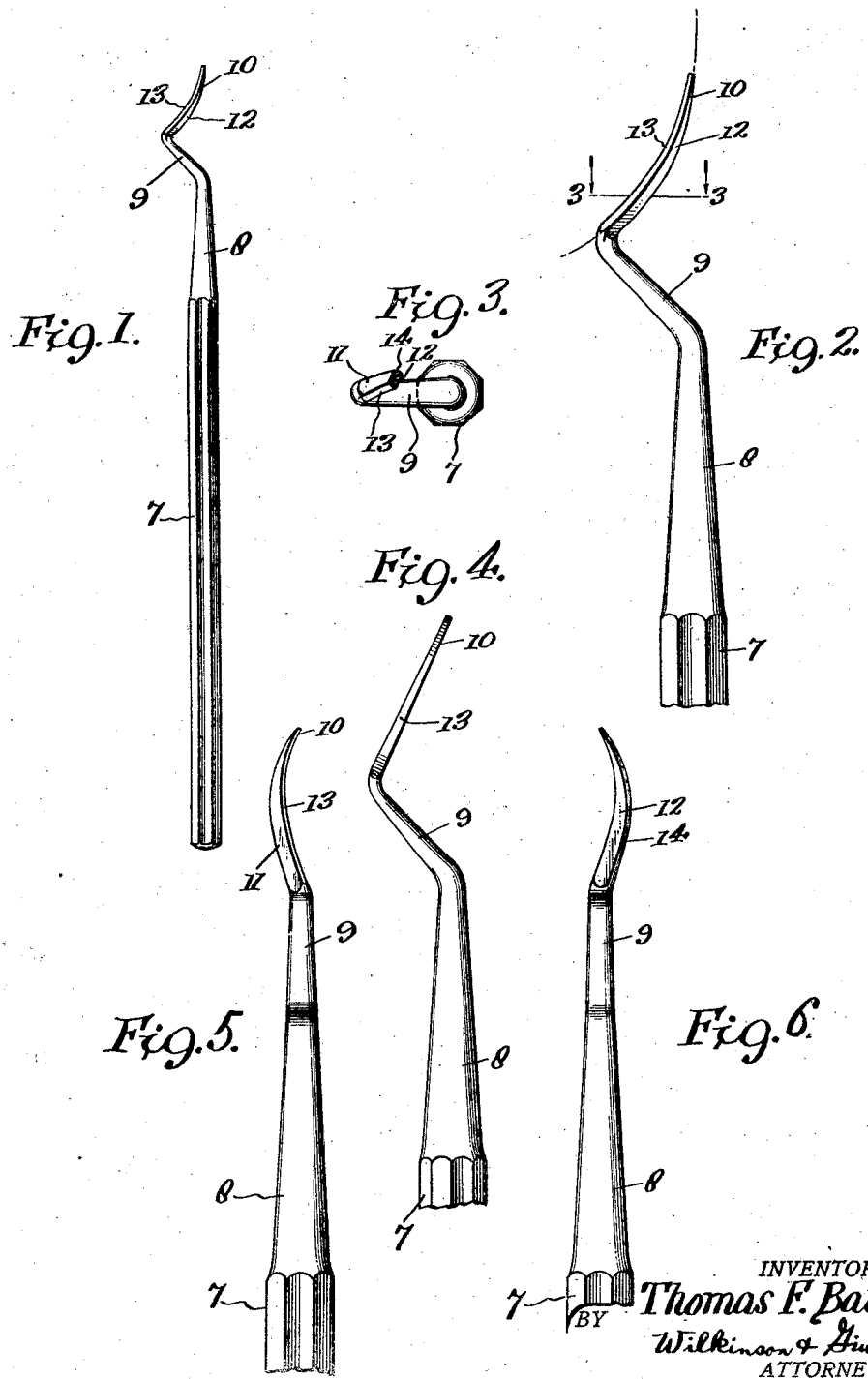

1,605,322

UNITED STATES PATENT OFFICE.

THOMAS F. BATES, OF SHELBYVILLE, TENNESSEE.

PYORRHEA CURETTE.

Application filed November 27, 1925. Serial No. 71,749.

The present invention relates to improvements in pyorrhea curettes, and has for an object certain improvements over my prior Patent No. 1,220,933, granted March 27, 1917 entitled Dental scaler and over the invention shown and described in my co-pending application, Serial No. 650,471, filed July 9, 1923 for dental curettes, whereby certain operative procedures, not possible with the prior instruments, may be carried out effectively and expeditiously.

Another object of the invention is to provide an extremely simple form of instrument which will fit the long axis of the tooth and tooth root admitting of its lying along the tooth and passing beneath the gum, while being rotated around the tooth root to repair the tissues in the treatment of pyorrhea.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side view of the improved instrument.

Figure 2 is a fragmentary side view on an enlarged scale taken from the same side.

Figure 3 is a transverse section taken on the line 3—3 in Figure 2.

Figure 4 is also a fragmentary enlarged side view showing the tooth engaging edge of the instrument.

Figure 5 is a similar view showing one side edge of the instrument together with the tooth engaging surface at the right thereof, and Figure 6 is also a side view showing the opposite flat side wall of the instrument.

Referring more particularly to the drawings, 7 designates the handle of the instrument, 8 the tapered shank extending upwardly from the handle and 9 the diagonal upwardly projecting portion of the shank which carries the blade designated generally at 10. This blade extends in a general direction at right angles to the diagonal portion 9 and the tip of the blade is substantially in alinement with the extended axis of the handle 7 to make it convenient to rotate the instrument and to exert the necessary pressure upon the blade portion in a direct line.

The blade is made with the flat side walls 11 and 12, and with the tooth engaging narrow elongated wall 13. The blade is curved to conform substantially to the long axis of the tooth and the tooth engaging wall 13 follows this curvature. The wall 13 is not a spiral wall, as shown and described in my co-pending application aforesaid, but it is a section of a true cylinder. There is also a rear wall 14 of the blade forming a structure, which is substantially rectangular in cross section, as shown in Figure 3, with one of the side walls 12 facing downwardly toward the diagonal portion 9 of the handle shank, and with the tooth engaging surface or wall 13 lying at substantially right angles to the walls 11 and 12, which are approximately parallel to one another except that the entire blade tapers outwardly to a sharpened circular tip. The side edges of the plain wall 13 are preferably sharpened. This is accomplished by drawing a one inch cylinder stone across the blade at right angles to its long dimension. The device in my prior patent above referred to permits of a scaling operation by a pull cut only whereas the present implement permits o such a cut but in addition allows the blade 10 to be drawn around the root and teeth.

The wall or tooth engaging surface 13 is struck on the arc of a circle of approximately one inch in diameter. This approximately corresponds to the longitudinal convexity of the tooth roots, whereby the blade may be used to scale around the roots instead of up or down as in the patented construction.

The present implement also enables the dentist to cut into the alveolar border and liberate bone cells from the periostium, promoting the repair and building new bone; to freshen or curette the inner surfaces of the soft tissues forming the pyorrhea pocket, liberating fibro-blasts to form new fibrous tissue, thus making new connection with the cleaned and freshened cementum that covers the root; and further to induce a flow of healthy fresh blood after the removal with these same instruments of the abnormal diseased granulation tissue from the packets. The fresh blood seals the pocket, carries across the necessary tissue forming cells, thus effecting a reattachment of the soft tissues to the tooth root. This procedure will result in the elimination of the pocket and effect a cure if the operation is properly performed. These present instruments are primarily used as curettes, that is to scrape or remove the morbid contents of pyorrhea pockets from both the soft tissues and alveolar process and bone, all of which tissues surround and support the tooth. These curette blades are used also to cut slightly into and freshen the surfaces of the soft tissues, to liberate new tissue forming cells and to liberate healthy blood, and likewise to cut slightly into the alveolar process and bone, to liberate bone forming cells, to repair and build new bone. They incidentally may be used as scalers, scaling around the roots. With the present blades one can curette and scale around the tooth and roots, as well as from the bottom of the pocket up the roots; whereas with the patented scaler blades curetting and scaling are impracticable and these latter blades only permit of a draw cut from the bottom of the pocket up along axis of the roots.

The present instruments may also be used for the following purposes:—

For trimming and smoothing the overhanging edges and margins of fillings and inlays; for trimming and smoothing the walls and margins of cavities in teeth in their preparation for fillings and inlays; for carving amalgam and cement fillings, reproducing the correct cusps and sulci; for carving wax patterns for cast inlays, crowns etc.; for picking out and removing small portions of roots and small pieces of bone and alveolar process broken in extraction; and for sharp ended probes to locate and detect diseased bone and for locating small parts of instruments, such as hypodermic needles etc., accidentally broken off in the tissues during operation.

It is obvious that various changes and modifications may be made in the details of construction and design of the above specifically described embodiment of this invention without departing from the spirit thereof, such changes and modifications being restricted only by the scope of the following claims:—

What is claimed is:—

1. A pyorrhea curette including a blade having a tooth engaging surface curved to conform substantially to the long axis of the tooth root and having its side edges sharpened and lying substantially in the same true cylinder.

2. A pyorrhea curette comprising a handle having a shank and a diagonal portion extending from the shank, and a blade extending at substantially right angles from the shank toward the extended axis of the handle and with its tip lying approximately coincident with such extended axis of the handle, said blade being curved laterally with respect to the common plane of the handle and diagonal portion, said blade having its curved tooth engaging edge lying in a substantially true cylindrical section.

3. A pyorrhea curette comprising a handle having a shank and a diagonal portion extending from the shank, a blade extending at substantially right angles from the shank toward the extended axis of the handle and with its tip lying approximately coincident with such extended axis of the handle, said blade being curved laterally with respect to the common plane of the handle and diagonal portion, said blade having its curved tooth engaging edge lying in a substantially true cylindrical section, the tooth engaging wall being relatively narrow, elongated and tapering toward the tip of the blade, said blade having comparatively wide and flat side walls, and a connecting back wall forming a blade structure substantially rectangular in cross section.

THOMAS F. BATES.